US006687305B1

(12) United States Patent
Nakamura et al.

(10) Patent No.: US 6,687,305 B1
(45) Date of Patent: Feb. 3, 2004

(54) RECEIVER, CPU AND DECODER FOR DIGITAL BROADCAST

(75) Inventors: Taku Nakamura, Yokohama (JP); Yukio Fujii, Yokohama (JP); Kenji Katsumata, Yokohama (JP); Hiroyuki Koreeda, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 473 days.

(21) Appl. No.: 09/659,559

(22) Filed: Sep. 11, 2000

(30) Foreign Application Priority Data

Nov. 8, 1999 (JP) .......................................... 11-316618

(51) Int. Cl.⁷ ............................................. H04N 7/18
(52) U.S. Cl. .................. 375/240.26; 348/461; 348/462
(58) Field of Search ................................ 348/461–468; 375/240.25–240.29

(56) References Cited

U.S. PATENT DOCUMENTS 6,021,440 A * 2/2000 Post et al. .................. 709/231
6,275,507 B1 * 8/2001 Anderson et al. ........... 370/487
6,311,204 B1 * 10/2001 Mills .......................... 709/100
6,504,996 B1 * 1/2003 Na et al. ..................... 386/125

* cited by examiner

*Primary Examiner*—Andy Rao
(74) *Attorney, Agent, or Firm*—McDermott, Will & Emery

(57) ABSTRACT

In decoding a data signal that is associated with a compressed video signal and a compressed audio signal in digital broadcast and is multiplexed in digital broadcast, a digital broadcast receiver according to the present invention efficiently decodes the data signal when the data signal includes a compressed video signal or a compressed audio signal and the compression method used for the compressed video signal or the compressed audio signal is the same as that used for the compressed video signal or the compressed audio signal multiplexed in the digital broadcast. The data signal separated by a demultiplexer 21 is stored in a data decoder 45 in a memory 40. A CPU 30 analyzes the stored data signal and stores the data signal analyzed by the CPU 30 in a decoder buffer 51 when the analyzed data signal includes a compressed video signal or a compressed audio signal and the compression method used for the compressed video signal or the compressed audio signal is the same as that used for the compressed video signal or the compressed audio signal multiplexed in the digital broadcast signal.

15 Claims, 10 Drawing Sheets

RECEIVER, CPU AND DECODER FOR DIGITAL BROADCAST

BACKGROUND OF THE INVENTION

The present invention relates to a digital broadcast receiver for receiving a digital broadcast signal in which a compressed video signal, a compressed audio signal, and a data signal in association with the compressed video and audio signals are multiplexed, as well as a CPU and a decoder used for the digital broadcast.

FIG. 9 shows a typical configuration of a conventional digital broadcast receiver for receiving digitally compressed digital broadcast that is defined by the ISO/IEC 13818 standard and usually abbreviated as MPEG2.

The digital broadcast receiver shown in the figure comprises a tuner/FEC (Forward Error Correctioner) 10, an antenna 11, a demultiplexer 20, a CPU 30, a memory 40, a decoder buffer 50, a video decoder 60, data selectors 70 and 90, an audio decoder 80, a CPU interface 100, a display 110, a speaker 120, and a data bus 130.

The electric waves of digital broadcast received by the antenna 11 are amplified and detected by a tuner in the tuner/FEC 10, and then subjected to FEC (Forward Error Correction), so that the electric waves of the digital broadcast are converted into a digital signal. The digital signal is sent to the demultiplexer 20. The demultiplexer 20 separates a digital broadcast signal obtained from the tuner/FEC 10, in which signal a compressed video signal, a compressed audio signal, and a data signal are multiplexed, to supply the compressed video signal and the compressed audio signal to the decoder buffer 50 and supply the data signal to the memory 40 via the data bus 130.

The decoder buffer 50 retains the compressed video signal and the compressed audio signal. The video decoder 60 reads the compressed video signal from the decoder buffer 50, decodes the signal according to a PTS (Presentation Time Stamp), and sends the result of signal decoding to the selector 70. The audio decoder 80 reads the compressed audio signal from the decoder buffer 50, decodes the signal according to a PTS, and sends the result of signal decoding to the selector 90. The memory 40 accumulates the data signal mentioned above, and also stores programs to be executed by the CPU 30, which will be described below. The CPU 30 executes, by time division, a plurality of programs such as a data decoder 42, an OSD (On Screen Display) 43, a system control 44, and the like extracted to an execution program area 41 of the memory 40, and accordingly supplies a data signal to the data bus 130, which will be described later. The data decoder 42 analyzes the header portion of the data signal, and decodes the data signal according to the type of data indicated in the header portion of the data signal. The OSD 43 performs calculations for image rendering necessary for OSD display. The system control 44 controls the entire digital broadcast receiver.

The CPU interface 100 obtains from the data bus 130 a video signal and an audio signal decoded by the data decoder 42, a program executed by the CPU 30. The CPU interface 100 then supplies the video signal and the audio signal to the selector 70 or the selector 90 according to the signal type obtained, and sends a control signal to the selector 70 or the selector 90. According to the control signal from the CPU 30, the selector 70 selects the output of the video decoder 60 when broadcast, the main signal, is to be outputted, and selects the video signal supplied from the CPU interface 100 and supplies the video signal to the display 110, which will be described below, when the video signal included in the data signal is to be outputted. According to the control signal from the CPU 30, the selector 90 selects the output of the audio decoder 80 when broadcast, the main signal, is to be outputted, and selects the audio signal supplied from the CPU interface 100 and supplies the audio signal to the speaker 120, which will be described below, when the audio signal included in the data signal is to be outputted. The display 110 displays the video signal supplied from the selector 70. The speaker 120 outputs the audio signal supplied from the selector 90. The data bus 130 is a path for transmitting the data signal processed by the CPU 30 to each part in the digital broadcast receiver.

According to the configuration described above, if a data signal is multiplexed in a digital broadcast signal, a display and an audio output can be obtained by subjecting the data signal to software decoding by the data decoder 42.

Incidentally, there is disclosed in Japanese Patent Laid-open No. Hei 07-264562 an example of a digital broadcast receiver that decodes a digital broadcast signal in which a compressed video signal, a compressed audio signal, and an accompanying data signal are multiplexed.

SUMMARY OF THE INVENTION

As digital compression technology has been improved, the proportion of a transmission line for digital broadcast occupied by a compressed video/audio signal has been reduced. Thus, it has been possible to transmit a greater amount of data signal.

Therefore, it has been possible to transmit not only conventional data, which is mostly text data, but also video and audio data such as video clips and effect sound. As a result, more various data can be transmitted.

When video and audio data for digital broadcast is to be transmitted, it is possible to transmit the data without compressing it. However, more data can be transmitted if the data is compressed, as is a video and audio signal for digital broadcast, and transmitted as a data signal.

Now, in a conventional digital broadcast receiver as shown in FIG. 9, all of the data signal is decoded by a data decoder 42. Thus, after analyzing the data signal, the data decoder 42 needs to decode the data signal in the same manner as a video decoder 60 and an audio decoder 80 do even if the data transmitted is compressed by the same method as that used for a compressed video signal or a compressed audio signal multiplexed in digital broadcast. In addition, in cases where a compressed still image is transmitted, it is more efficient if the video decoder decodes it as a compressed video signal.

Moreover, as digital compression technology has been improved, the process of decoding a compressed video signal or a compressed audio signal has become more complex, and therefore the processing load on a CPU 30 when the data decoder 42 is used has been increased. Since the CPU 30 executes, by time division, other programs such as OSD 43 and system control 44, the increase in the processing load on the data decoder 42 affects the operation of the entire digital broadcast receiver. Specific examples of the operation affected include image rendering by the OSD 43. When the decoding of a data signal is started, the priority of the image rendering process of the OSD 43 is lowered, and therefore it will take more time for switching in the OSD screen than before. For example, if data broadcast is selected from a menu displayed by the OSD, the operation of the OSD becomes slower on starting the decoding of the data signal. Thus, this problem greatly affects the user.

In the meantime, the results of signal decoding by the video decoder 60 and the audio decoder 80 are not selected at selectors 70 and 90 respectively during the decoding of the data signal. Therefore, decoding is performed but the result of decoding is not outputted.

Thus, when a compressed video signal or a compressed audio signal included in a data signal is to be decoded and outputted, the load on the CPU 30 becomes heavier, while the results of decoding by the video decoder 60 and the audio decoder 80 are not outputted. Therefore, the efficiency of utilization in the entire digital broadcast receiver is poor.

An object of the present invention is to provide a digital broadcast receiver that makes it possible in decoding a data signal to relieve the increasing processing load on the CPU, which increase results when a compressed video signal and a compressed audio signal are decoded, and to provide a CPU and a decoder used for this object.

According to the present invention, there is provided a digital broadcast receiver comprising: a demultiplexer for separating a digital broadcast signal in which a compressed video signal, a compressed audio signal, and a data signal in association with the compressed video and audio signals are multiplexed; a decoder buffer for storing the compressed video signal and the compressed audio signal separated by the demultiplexer; a video decoder for decoding the compressed video signal in the decoder buffer; an audio decoder for decoding the compressed audio signal in the decoder buffer; a memory for storing the data signal separated by the demultiplexer; and a CPU for analyzing the data signal stored in the memory; wherein the CPU allows the data signal analyzed by the CPU to be stored in the decoder buffer when the analyzed data signal includes a compressed video signal or a compressed audio signal and the compression method used for the compressed video signal or the compressed audio signal is the same as that used for the compressed video signal or the compressed audio signal multiplexed in the digital broadcast signal.

In addition, according to the present invention, the decoder buffer possesses, by time division, the compressed video signal and the compressed audio signal separated by the demultiplexer as well as the compressed video signal and the compressed audio signal included in the data signal, and uses each of the signals in an exclusive manner.

Moreover, according to the present invention, the video decoder and the audio decoder retain a write address used when the compressed video signal and the compressed audio signal included in the data signal are stored in the decoder buffer, and from the difference between the write address and a read address for the video decoder and the audio decoder to read the decoder buffer, senses whether the compressed video signal and the compressed audio signal accumulated in the decoder buffer are depleted or not, or senses the progress of decoding, whereby the video decoder and the audio decoder stop, resume, or repeat decoding.

According to the present invention, the processing load on the CPU can be reduced because the compressed video signal and the compressed audio signal included in the data signal are decoded not by using software, but by using the video decoder and the audio decoder which are already provided to decode the main broadcast.

Furthermore, a reduced CPU processing load makes it possible not only to improve the processing speed of conventional functions and reduce the cost of the CPU but also to add new processing functions. For example, the receiver may be provided with a communication function and the communication function may be performed by software processing by the CPU when data signals are to be obtained not only from the demultiplexer but also from a network such as the Internet. As a result, a reduction in the number of external parts and other effects can be obtained.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Preferred Embodiments of the present invention will now be described in detail with reference to the accompanying drawings.

First, a first embodiment of the present invention will be described.

Figure 1:
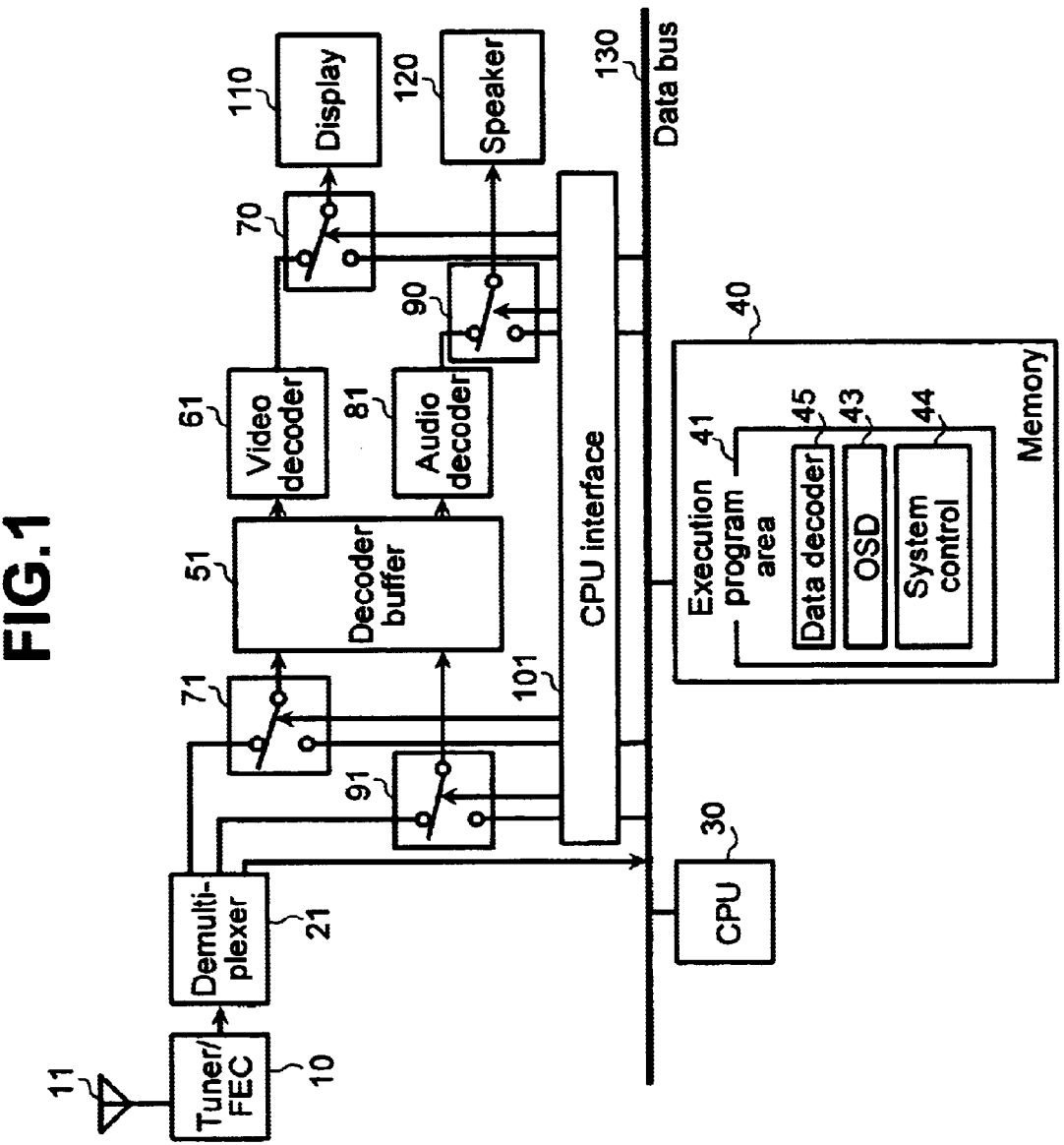
FIG. 1 is a block diagram showing a first embodiment of the present invention.

FIG. 1 shows a first digital broadcast receiver according to the present invention.

Figure 9:
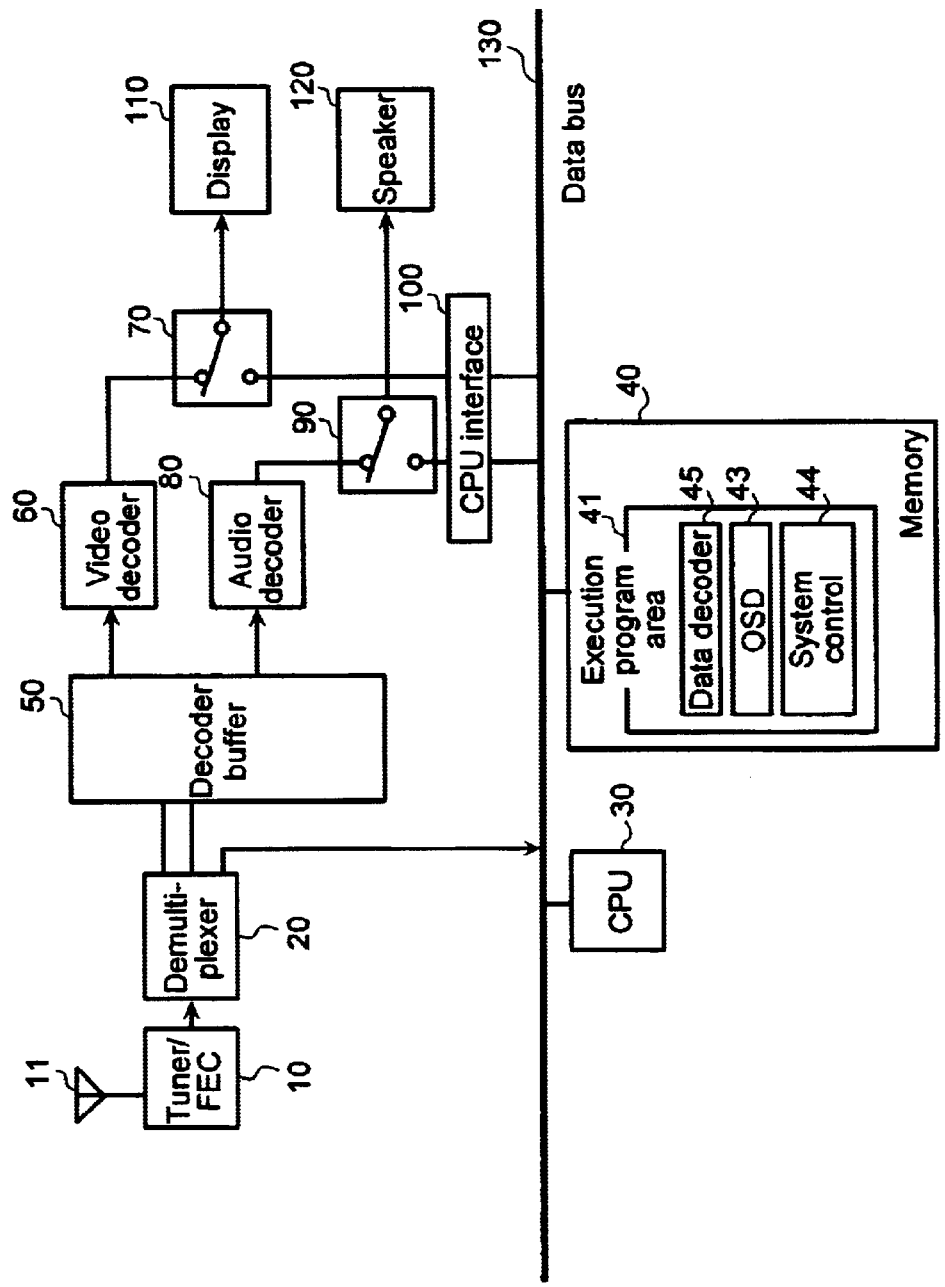
FIG. 9 is a block diagram showing the configuration of a conventional digital broadcast receiver.

As shown in the figure, the digital broadcast receiver comprises a tuner/FEC 10, an antenna 11, a demultiplexer 21, a CPU 30, a memory 40, a decoder buffer 51, a video decoder 61, selectors 70, 71, 90, and 91, an audio decoder 81, a CPU interface 101, a display 110, a speaker 120, and a data bus 130. Of these components, the tuner/FEC 10, the antenna 11, the CPU 30, the memory 40, the selectors 70 and 90, and the data bus 130 are the same as those of the digital broadcast receiver as shown in FIG. 9. Therefore description of the above components will be omitted.

The demultiplexer 21 separates a digital signal obtained from the tuner/FEC 10, in which signal a compressed video signal, a compressed audio signal, and a data signal are multiplexed, to supply the compressed video signal to the selector 71 and supply the compressed audio signal to the selector 91. The data signal is supplied to the memory 40 via the data bus 130. A data decoder 45 executed by the CPU 30 analyzes the data signal and identifies the type of data signal indicated in the data signal.

When the content of the data signal represents a video signal, the type of video signal and whether the video signal is compressed or not are determined. If the video signal is compressed by the same method as that used for the compressed video signal multiplexed in the digital broadcast signal, the video signal is sent to the selector 71 via the data bus 130 and the CPU interface 101 to be written into the decoder buffer 51. In other cases, the video signal is subjected to software decoding by the data decoder 45, and is sent to the selector 70 via the data bus 130 and the CPU interface 101 to be displayed by the display 110.

When the content of the data signal represents an audio signal, the type of audio signal and whether the audio signal is compressed or not are determined when the audio signal is compressed by the same method as that used for the compressed audio signal multiplexed in the digital broadcast signal, the audio signal is sent to the selector 91 via the data bus 130 and the CPU interface 101 to be written into the decoder buffer 51. In other cases, the audio signal is subjected to software decoding by the data decoder 45, and is sent to the selector 90 via the data bus 130 and the CPU interface 101 to be outputted by the speaker 120.

When the content of the data signal is text data or the like and is not either an audio signal or a video signal, the data signal is subjected to software decoding by the data decoder 45, and the decoded video signal is outputted to the selector 70 via the data bus 130 and the CPU interface 101. The CPU interface 101 obtains from the data bus 130 a video signal or an audio signal processed by the data decoder 45, a program executed by the CPU 30, to supply the video signal or the audio signal to any one of the selectors 70, 71, 90, and 91 according to control by the CPU 30. The CPU interface 101 selects either to output the main broadcast or to output data broadcast according to control by the CPU 30, and sends a control signal to the selectors 70, 71, 90, and 91. In the data signal, a plurality of compressed video signals or compressed audio signals may be multiplexed. In this case, the data decoder 45 supplies the compressed video signals to the selector 71, and also the data decoder 45 itself decodes the compressed video signals at the CPU 30, whereby multi-channel decoding is made possible. When MPEG4 data and MPEG2 data are multiplexed in the data signal, for example, the data decoder 45 supplies the MPEG2 data to the selector 71, and also the data decoder 45 itself decodes the MPEG4 data at the CPU 30. Thus, the CPU and the decoder according to the present invention enables parallel decoding.

Under control by the CPU 30, the selector 71 outputs to the decoder buffer 51 the compressed video signal multiplexed in the digital broadcast signal sent from the demultiplexer 21 when the main broadcast is to be decoded, and outputs to the decoder buffer 51 the compressed video signal supplied by the CPU interface 101 when the compressed video signal included in the data signal is to be decoded.

Under control by the CPU 30, the selector 91 outputs to the decoder buffer 51 the compressed audio signal multiplexed in the digital broadcast signal sent from the demultiplexer 21 when the main broadcast is to be decoded, and outputs to the decoder buffer 51 the compressed audio signal supplied by the CPU interface 101 when the compressed audio signal included in the data signal is to be decoded.

The decoder buffer 51 retains the video signal or the audio signal inputted from the selector 71 or the selector 91. The video decoder 61 reads the compressed video signal from the decoder buffer 51, decodes the signal according to a PTS, and outputs the result of signal decoding to the selector 70. The audio decoder 81 reads the compressed audio signal from the decoder buffer 51, decodes the signal according to a PTS, and outputs the result of signal decoding to the selector 90.

According to the present invention, the configuration as described above makes it possible to reduce the processing load on the CPU 30 by decoding the compressed video signal and the compressed audio signal using the video decoder 61 and the audio decoder 81 without using the data decoder 45 that conventionally performed decoding operation.

Next, a second embodiment of the present invention will be described.

Figure 2:
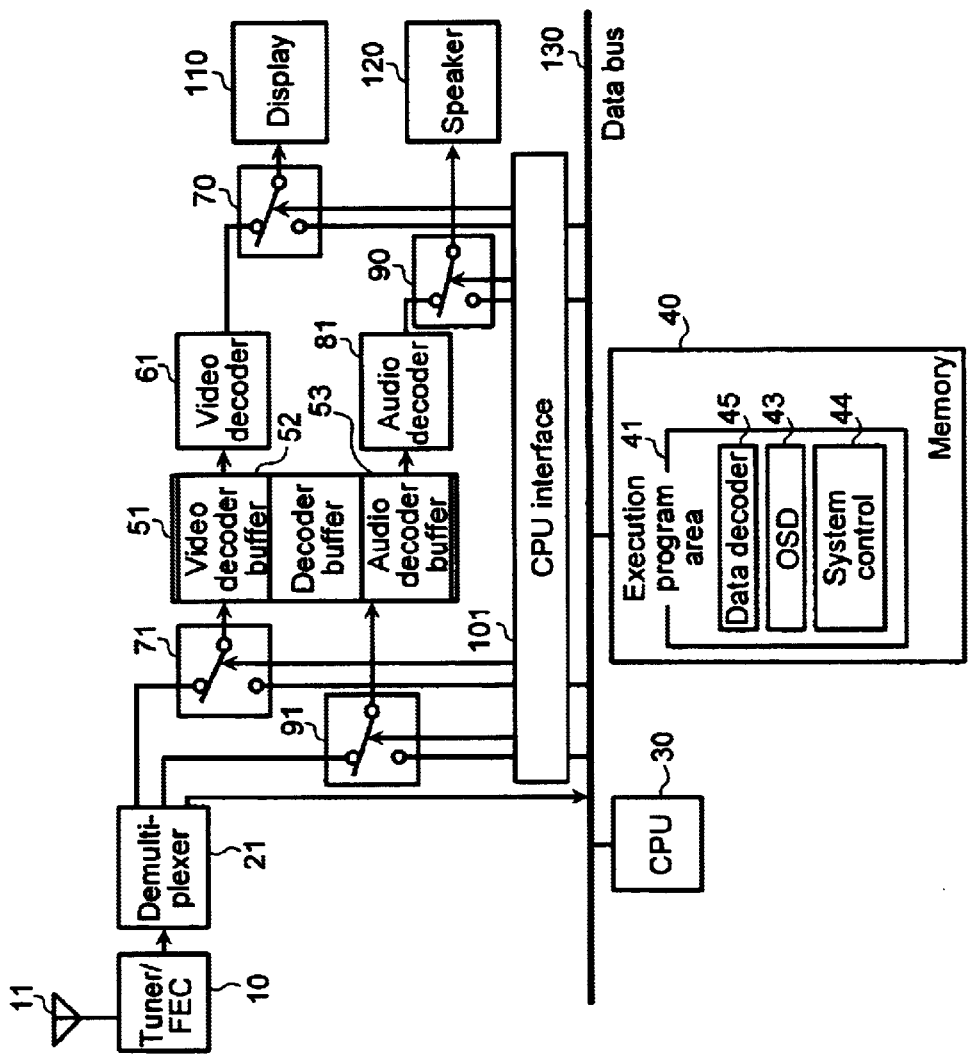
FIG. 2 is a block diagram showing a second embodiment of the present invention.

FIG. 2 shows a second digital broadcast receiver according to the present invention, in which attention is directed especially to the method of using the decoder buffer 51 in FIG. 1.

In FIG. 2, like parts are identified by the same reference numerals as in FIG. 1, and description of these parts will be omitted.

In FIG. 2, the decoder buffer 51 contains a video decoder buffer 52, which is an area for storing a compressed video signal, and an audio decoder buffer 53, which is an area for storing a compressed audio signal, within the decoder buffer 51. Here, the video decoder buffer 52 possesses, by time division, either the compressed video signal multiplexed in digital broadcast or the compressed video signal included in the data signal. Similarly, the audio decoder buffer 53 possesses, by time division, either the compressed audio signal multiplexed in digital broadcast or the compressed audio signal included in the data signal.

The video decoder 61 reads data from the video decoder buffer 52 within the decoder buffer 51 where the compressed video signal is accumulated, and decodes the data. Similarly, the audio decoder 81 reads data from the audio decoder buffer 53 within the decoder buffer 51 where the compressed audio signal is accumulated, and decodes the data.

The second embodiment eliminates an increase in the capacity of the memory caused by data signal decoding operation because the compressed video signal multiplexed in digital broadcast and the compressed video signal included in the data signal are placed in an exclusive manner in the same area.

In addition, the video decoder 61 and the audio decoder 81 do not need to differentiate the main broadcast data from the data of data broadcast in the decoder buffer 51. Therefore, a digital broadcast receiver capable of decoding data broadcast can be configured by using the existing video decoder and audio decoder which decode only the main broadcast.

Next, a third embodiment of the present invention will be described.

Figure 3:
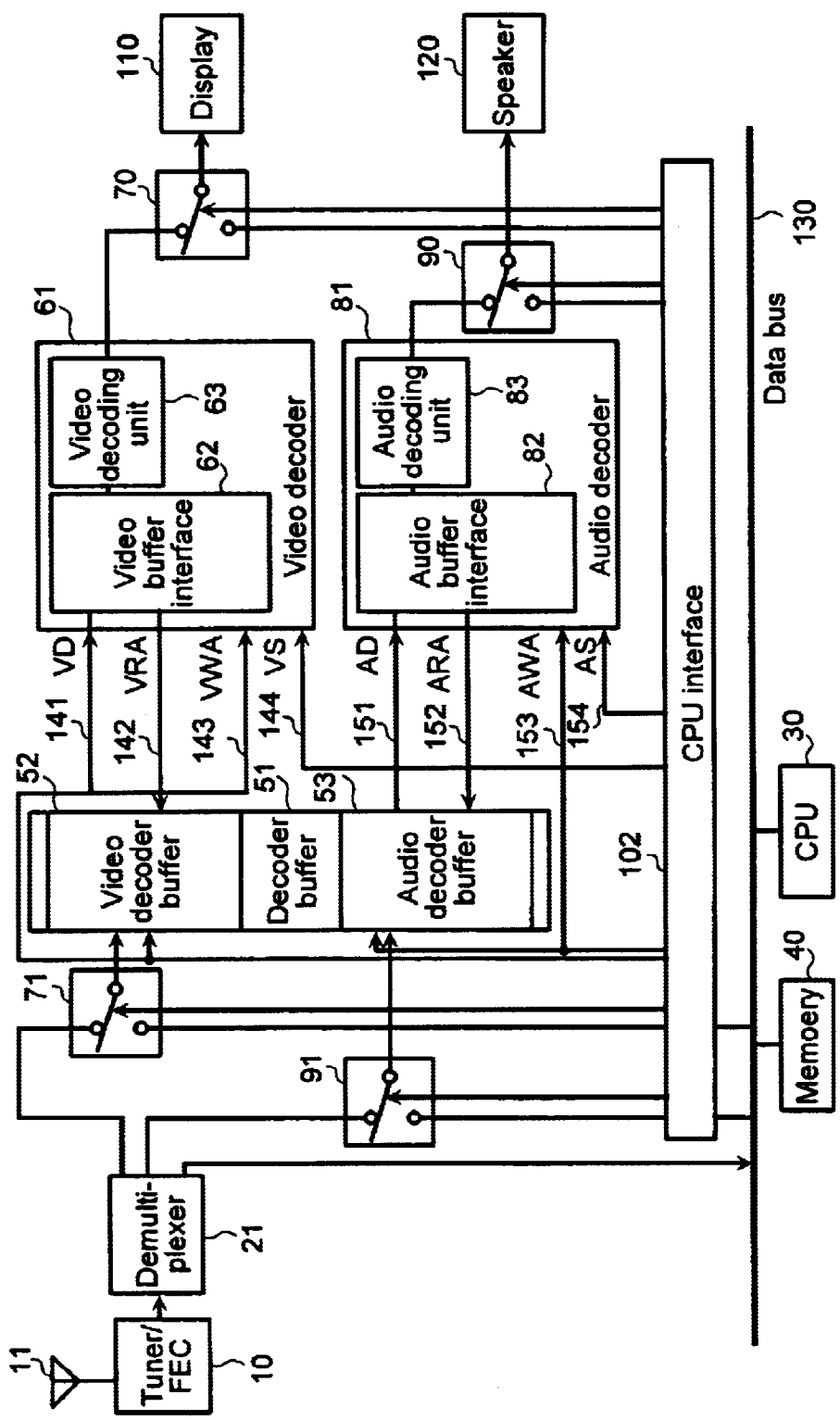
FIG. 3 is a block diagram showing a third embodiment of the present invention.

FIG. 3 shows a third digital broadcast receiver according to the present invention.

As shown in the figure, the present digital broadcast receiver is different from the digital broadcast receiver shown in FIG. 2 in that the present digital broadcast receiver is provided with a CPU interface 102, VD 141 (Video Data; an abbreviation for video data transmitted on a video data line), VRA 142 (Video Read Address: an abbreviation for video read address data transmitted on a video read address line), VWA 143 (Video Write Address: an abbreviation for video write address data transmitted on a video write address line), VS 144 (Video Start: an abbreviation for video start data transmitted on a video start line), AD 151 (Audio data: an abbreviation for audio data transmitted on an audio data line), ARA 152 (Audio Read Address: an abbreviation for audio read address data transmitted on an audio read address data line), AWA 153 (Audio Write Address: an abbreviation for audio write address data transmitted on an audio write address data line), AS 154 (Audio Start: an abbreviation for audio start data transmitted on an audio start line), a video buffer interface 62, a video decoding unit 63, an audio buffer interface 82, and an audio decoding unit 83. The rest of the present digital broadcast receiver is the same as that of the digital broadcast receiver shown in FIG. 2. Therefore, like parts are identified by the same reference numerals as in FIG. 2, and their description will be omitted.

When the CPU interface 102 writes a compressed video signal included in a data signal to a video decoder buffer 52 within a decoder buffer 51, the CPU interface 102 sends a write address to the video buffer interface 62, which will be described below, by using the VWA 143.

The video buffer interface 62 inputs data at an address specified in the VRA 142 into a video decoder 61 from the video decoder buffer 52 by using the VD 141. It also retains a write address for a CPU 30 to write the decoder buffer 51, which is sent from the VWA 143.

In the case of audio data, the data is read into an audio decoder 81 by the same methods.

Specifically, when the CPU interface 102 writes a compressed audio signal included in the data signal to an audio decoder buffer 53 within the decoder buffer 51, the CPU interface 102 sends a write address to the audio buffer interface 82, which will be described below, by using the AWA 153.

The audio buffer interface 82 inputs data at an address specified in the ARA 152 into an audio decoder 81 from the audio decoder buffer 53 by using the AD 151. It also retains a write address for the CPU 30 to write the decoder buffer 51, which is sent from the AWA 153.

Here, both the video decoder and the audio decoder can determine whether data accumulated in the buffer is depleted or not by checking write and read addresses for the buffer. Here description will be made by taking an audio signal as an example.

Figure 4:
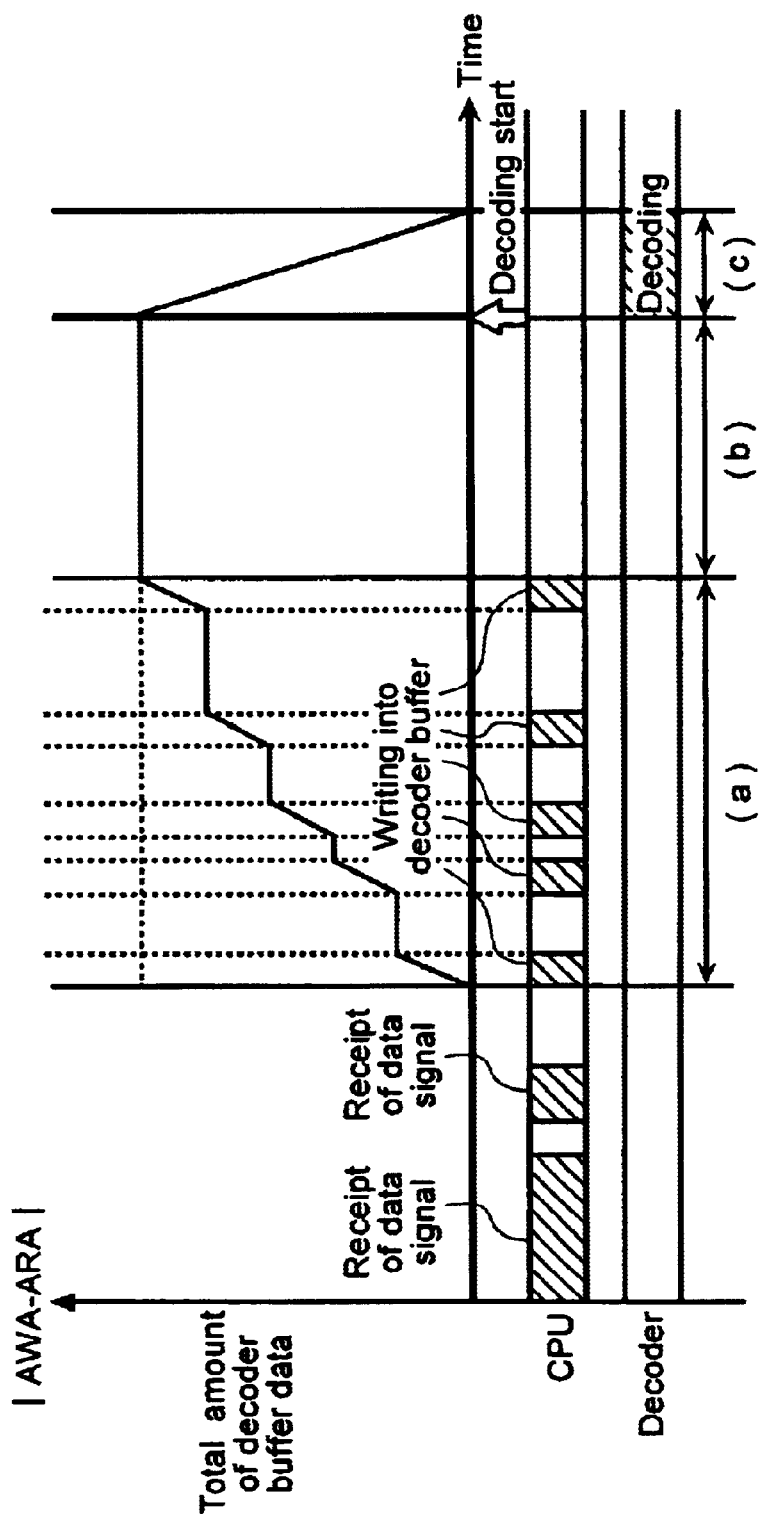
FIG. 4 shows changes in the total amount of data in a decoder buffer when decoding is performed.

FIG. 4 shows changes in the amount of data in the buffer. The axis of abscissas in the graph denotes passage of time, while the axis of ordinates denotes the difference between the ARA 152 and the AWA 153. At the bottom of the graph, processing at the same time by the CPU 30 and the audio decoding unit 83 is shown. Here, the difference between the ARA 152 and the AWA 153 denoted by the axis of ordinates corresponds to the amount of remaining data in the audio decoder buffer 53.

After receiving a data signal in a memory 40, the CPU 30 analyzes the data signal, and when the data signal is compressed by the same method as that used for the main broadcast, the CPU 30 allows the audio decoder 81 to decode the data signal.

Here, the process of decoding the compressed audio signal is divided into three parts (a), (b), and (c), and description of each of the three parts will be made.

Part (a): The compressed audio signal included in the data signal is written from the CPU 30 into the audio decoder buffer 53 via the CPU interface 102. Since the CPU 30 is executing programs other than the data decoding program such as the OSD program and the program for control of the entire system, the CPU 30 intermittently transfers the compressed audio signal via the data bus 130 using a transfer method such as DMA (Direct Memory Access). At this point in time, reading by the audio buffer interface 82 is not performed, and therefore the compressed audio signal in the decoder buffer 51 increases at a steady rate.

Part (b): A specified amount of compressed audio signal is accumulated in the audio decoder buffer 53. The audio decoder buffer 53 is waiting for the start of decoding.

Part (c): An instruction for the audio decoder 81 to start decoding is given from the CPU 30 via the AS 154, whereby decoding is started. The compressed audio signal in the buffer is decoded, and thereby the compressed audio signal is being consumed. Decoding by the audio decoder 81 reduces the difference between the AWA 153 and the ARA 152. When the difference between the AWA 153 and the ARA 152 becomes zero, the audio decoder 81 determines that the data is depleted and stops decoding operation. Alternatively decoding can be repeated by resetting the ARA 152 at zero and resuming the reading of the compressed audio signal in the decoder buffer 51. Alternatively decoding can be resumed from a certain middle point by resetting the ARA 152 at a specified address retained when the compressed audio signal is written into the decoder buffer 51.

In either case, only the starting process for the audio decoder 81 by means of the AS 154 is required of the CPU 30, and therefore the control of compressed audio signal decoding is readily performed.

The decoding of a compressed video signal is performed in the same manner.

The amount of data in data broadcast to be decoded at a time is small as compared with the main broadcast, and when decoded data is to be decoded repeatedly, the same data must be frequently transferred to the decoder buffer 51.

According to the third embodiment, when all of the compressed video/audio signal included in the data signal can be stored in the decoder buffer 51, first the compressed video/audio signal is merely stored in the decoder buffer 51, and then the compressed video/audio signal does not need to be supplied intermittently to the decoder buffer 51, which, in the data bus 130, can be used effectively in transferring data other than the result of signal decoding by the data decoder, or in transferring OSD data, for example. This is effective especially in applications such as repeating background music in data broadcast.

Next, a fourth embodiment of the present invention will be described.

Figure 5:
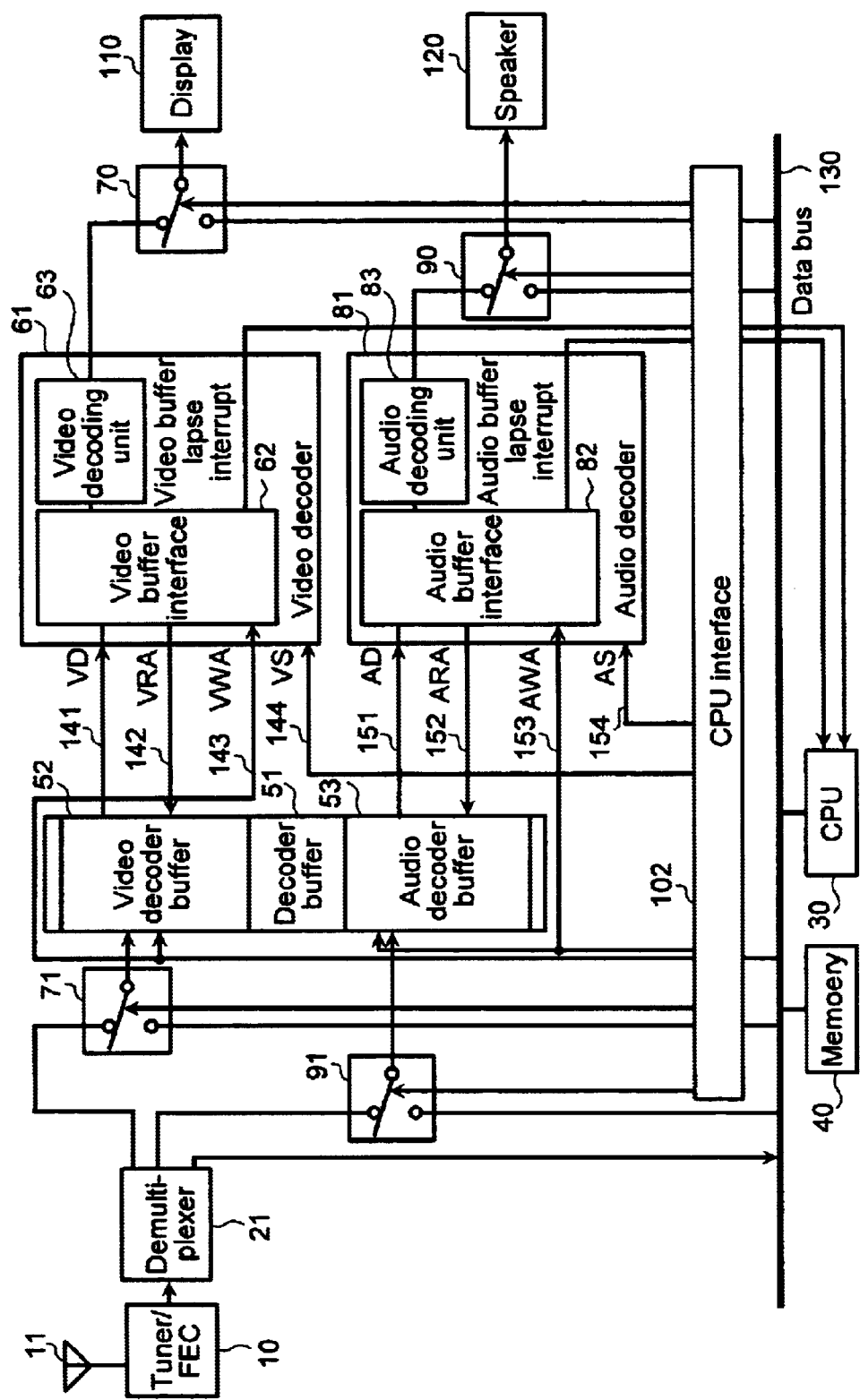
FIG. 5 is a block diagram shown fourth embodiment of the present invention.

FIG. 5 shows a fourth digital broadcast receiver according to the present invention.

As shown in the figure, the present digital broadcast receiver is different from the digital broadcast receiver shown in FIG. 3 in that the present digital broadcast receiver is provided with a video buffer lapse interrupt 160 and an audio buffer lapse interrupt 170. The rest of the present digital broadcast receiver is the same as that of the digital broadcast receiver shown in FIG. 3. Therefore, like parts are identified by the same reference numerals as in FIG. 38 and their description will be omitted. The components representing the alteration will be described below.

The video buffer lapse interrupt 160 occurs when an address retained by a video buffer interface 62 via VWA 143 coincides with VRA 142. Similarly, the audio buffer lapse interrupt 170 occurs when an address retained by an audio buffer interface 82 via AWA 153 coincides with ARA 152.

Figure 6:
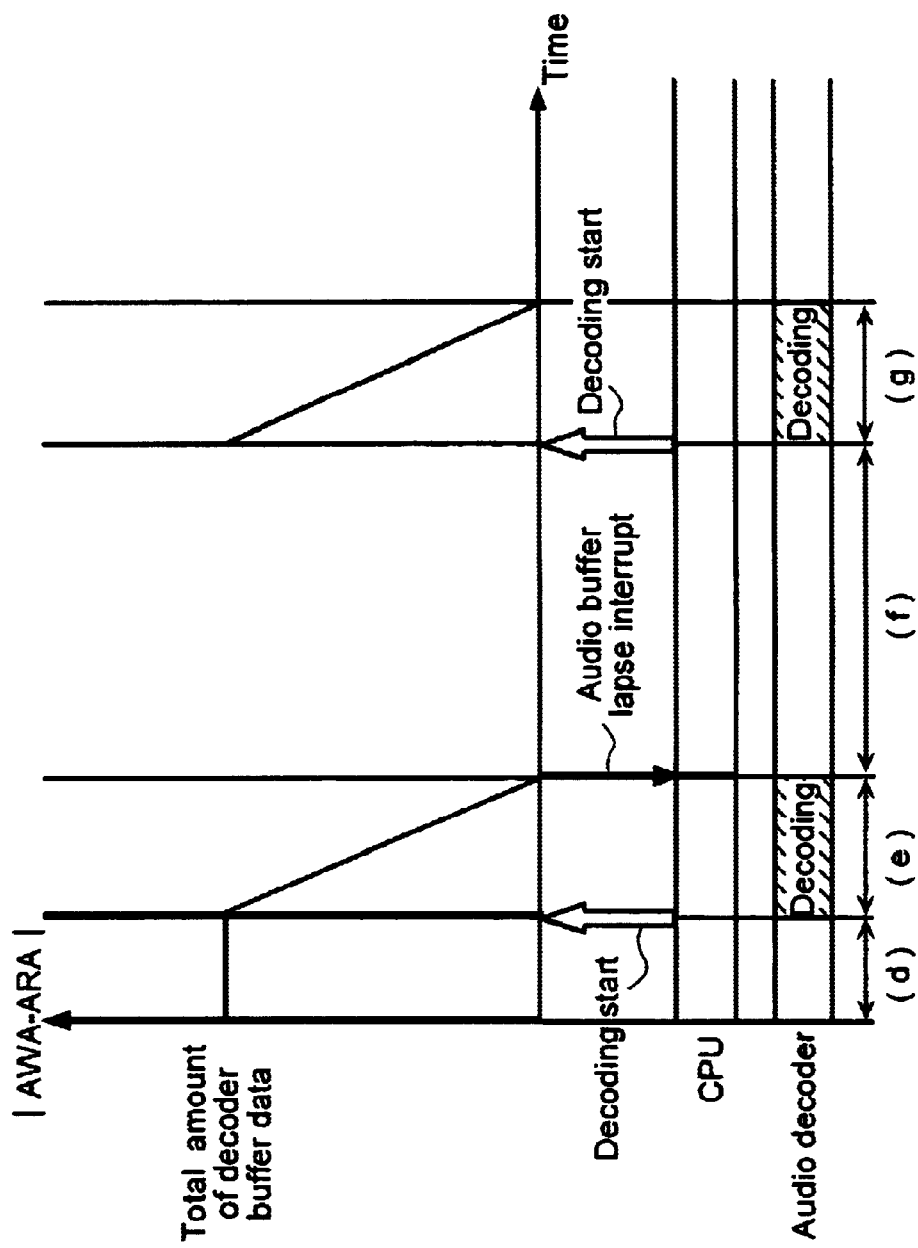
FIG. 6 shows changes in the total amount of data in a decoder buffer when repeated reproduction is performed by using an audio buffer lapse interrupt.

FIG. 6 shows the amount of data and processing by each unit during repetition decoding by the present digital broadcast receiver. Description will be made by taking the decoding of a compressed audio signal included in a data signal as an example.

Part (d): The compressed audio signal is accumulated in a decoder buffer 51. The decoder buffer 51 is waiting for the start of decoding.

Part (e): An instruction for an audio decoder 81 to start decoding is given from a CPU 30 via AS 154, whereby decoding is started. When one of the addresses retained by the audio buffer interface 82 via the AWA 153 coincides with the ARA 152, an interrupt is supplied to the CPU 30 via the audio buffer lapse interrupt 170. An audio decoder 81 stops decoding.

The audio buffer lapse interrupt 170 allows the CPU 30 to detect that the audio decoder 81 has stopped decoding the compressed audio signal in the decoder buffer 51. Thus, the CPU 30 restarts decoding at a section (g) by using AS 154, after a section of a given time period (f).

In FIG. 6, the address retained by the audio buffer interface 82 is the address that was last written into the decoder buffer 51 by the CPU 30. Therefore the interrupt occurs only when the data is depleted. However, decoding can also be stopped or resumed at any given point by retaining a plurality of addresses that are being written.

According to the fourth embodiment, the CPU 30 can freely set decoding resumption timing and the number of repetitions. Therefore, it can also be used for applications where synchronization with the main broadcast is required.

Next, a fifth embodiment of the present invention will be described.

Figure 7:
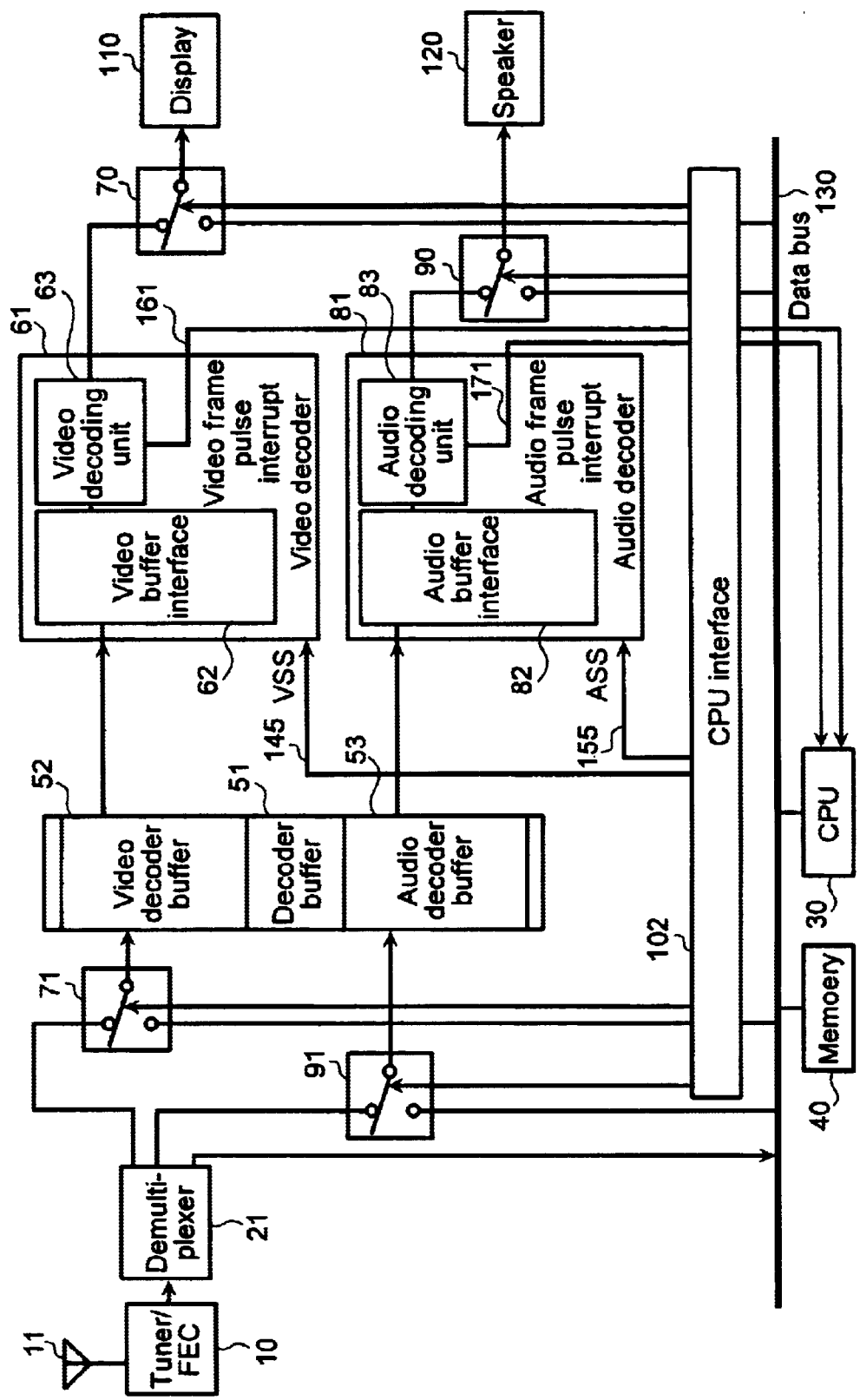
FIG. 7 is a block diagram showing a fifth embodiment of the present invention.

FIG. 7 shows a fifth digital broadcast receiver according to the present invention.

As shown in the figure, the present digital broadcast receiver is different from the digital broadcast receiver shown in FIG. 5 in that the present digital broadcast receiver is provided with VSS (Video start/stop) 145, ASS (Audio start/stop) 155, a video frame pulse interrupt 161, and an audio frame pulse interrupt 171. The rest of the present digital broadcast receiver is the same as that of the digital broadcast receiver shown in FIG. 5. Therefore, like parts are identified by the same reference numerals as in FIG. 5, and their description will be omitted. The components representing the alteration will be described below. The VSS 145 starts and stops decoding by a video decoder 61 in response to a control signal from a CPU 30. Similarly, the ASS 155 starts and stops decoding by an audio decoder 81 in response to a control signal from the CPU 30. The video frame pulse interrupt 161 occurs when the decoding of a frame of compressed video signal ends, and informs the CPU 30 of the end of decoding. Similarly, the audio frame pulse interrupt 171 occurs when the decoding of a frame of compressed audio signal ends, and informs the CPU 30 of the end of decoding.

Figure 8:
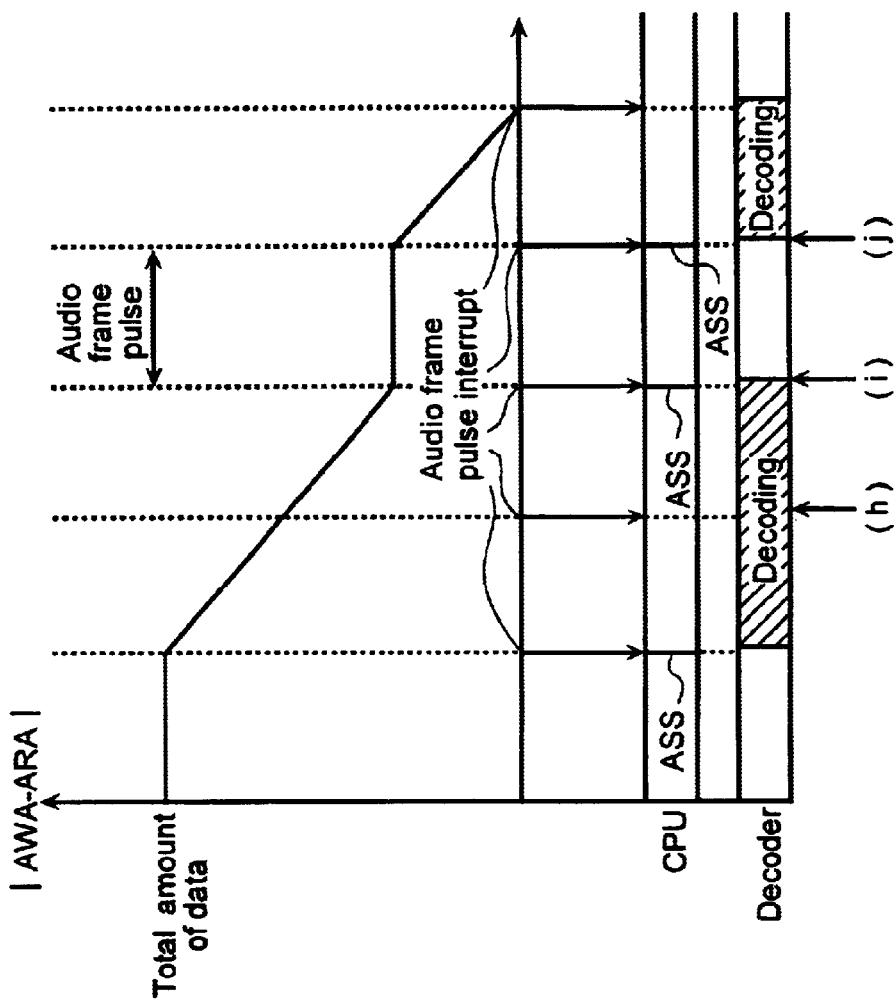
FIG. 8 shows changes in the total amount of data in a decoder buffer when decoding is stopped and resumed by using audio frame pulse interrupts.

FIG. 8 shows decoding control according to the present embodiment.

Description will be made by taking the decoding of a compressed audio signal included in a data signal as an example.

The CPU 30 sends a control signal to the ASS 155 at a point (h) to start decoding, and receives an interrupt from the audio decoder 81 each time a frame of data ends.

Then the CPU 30 sends a control signal to the ASS 155 at a point (i), which is specified by the program of a data decoder 45, to stop decoding.

Then the CPU 30 resumes decoding by the audio decoder 81 by sending a control signal to the ASS 155 at a point (j).

In the fifth embodiment, there has been described a method that allows the amount of remaining buffer data to be measured by using frame pulses when the number of frames of a compressed audio signal transferred by the CPU 30 is known in advance. The effect of the present embodiment is the same as that of the fourth embodiment.

Next, a sixth embodiment of the present invention will be described.

Figure 10:
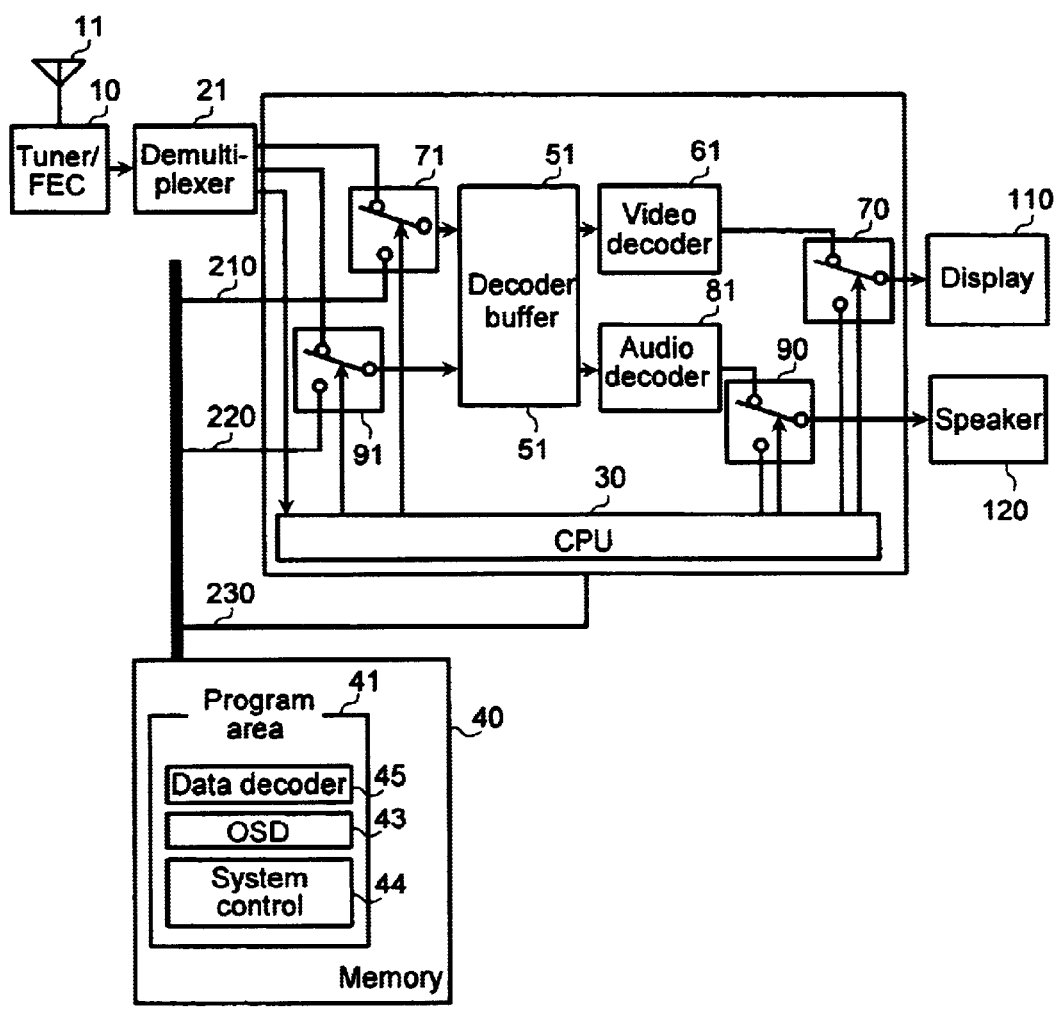
FIG. 10 is a block diagram showing a sixth embodiment of the present invention.

FIG. 10 shows a sixth digital broadcast receiver according to the present invention.

As shown in the figure, the present digital broadcast receiver is different from the digital broadcast receiver shown in FIG. 1 in that the present digital broadcast receiver is provided with a video data line 210, an audio data line 220, and a CPU data line 230. The rest of the present digital broadcast receiver is the same as that of the digital broadcast receiver shown in FIG. 1. Therefore, like parts are identified by the same reference numerals as in FIG. 1, and their description will be omitted.

It should be noted that in the present embodiment, a video decoder, an audio decoder, and a CPU are integrated in a package 200.

The video data line 210 reads a compressed video signal from a memory 40 by using a data bus 130. Similarly the audio data line 220 reads a compressed audio signal from the memory 40 by using the data bus 130. The CPU data line 230 is provided for the CPU 30 to write and read data in the memory 40.

A data signal separated by a demultiplexer 21 is supplied to the CPU 30. A data decoder 45 executed by the CPU 30 analyzes the data signal, identifies the type of data signal indicated in the data signal, and then stores the data signal in the memory 40. If the content of the data signal is a video signal, and the video signal can be decoded by the video decoder 61, the CPU 30 supplies the data signal to the video decoder 61 via the video data line 210 to decode the data signal. Similarly, If the content of the data signal is an audio signal, and the audio signal can be decoded by the audio decoder 81, the CPU 30 supplies the data signal to the audio decoder 81 via the audio data line 220 to decode the data signal.

In the six embodiment, there has been described a method in which a video decoder and an audio decoder are used when a data signal is decoded in a circuit in which the video decoder, the audio decoder, and a CPU are integrated.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

We claim:

1. A digital broadcast receiver comprising:
   a demultiplexer for separating a digital broadcast signal in which a compressed video signal, a compressed audio signal, and a data signal in association with the compressed video and audio signals are multiplexed;
   a decoder buffer for storing the compressed video signal and the compressed audio signal separated by said demultiplexer;
   a video decoder for decoding said compressed video signal in said decoder buffer;
   an audio decoder for decoding said compressed audio signal in said decoder buffer;
   a memory for storing said data signal separated by said demultiplexer; and
   a CPU for analyzing the data signal stored in said memory;
   wherein said CPU allows the data signal analyzed by said CPU to be stored in said decoder buffer when the analyzed data signal includes a compressed video signal or a compressed audio signal and the compression method used for the compressed video signal or the compressed audio signal is the same as that used for said compressed video signal or said compressed audio signal multiplexed in the digital broadcast signal.

2. A digital broadcast receiver as claimed in claim 1, wherein said CPU decodes analyzed data when the content of the analyzed data signal is a data signal which is not compressed by the same method as that used for the compressed video signal or the compressed audio signal multiplexed in the digital broadcast signal.

3. A digital broadcast receiver as claimed in claim 1, wherein said decoder buffer possesses, by time division, the compressed video signal and the compressed audio signal separated by said demultiplexer as well as the compressed video signal and the compressed audio signal included in said data signal, and uses each of the signals in an exclusive manner.

4. A digital broadcast receiver as claimed in claim 1, wherein said video decoder and said audio decoder retain a write address used when the compressed video signal and the compressed audio signal included in said data signal are stored in said decoder buffer, and from the difference between the write address and the read address for said video decoder and said audio decoder to read said decoder buffer, senses whether the compressed video signal and the compressed audio signal accumulated in said decoder buffer are depleted or not, or senses the progress of decoding, whereby said video decoder and said audio decoder stop, resume, or repeat decoding.

5. A digital broadcast receiver as claimed in claim 1, wherein said video decoder and said audio decoder produce an interrupt signal for said CPU according to whether the compressed video signal and the compressed audio signal accumulated in said decoder buffer are depleted or not, or according to the progress of decoding, whereby said CPU controls decoding in response to said interrupt signal.

6. A digital broadcast receiver as claimed in claim 1, wherein said video decoder and said audio decoder produce a frame pulse interrupt signal for said CPU, whereby said CPU receives said frame pulse interrupt signal and controls decoding by counting the number of frames related to the frames of said compressed video signal and said compressed audio signal.

7. A digital broadcast receiver comprising:
a demultiplexer for separating a digital broadcast signal in which a compressed video signal, a compressed audio signal, and a data signal in associate with the compressed video and audio signals are multiplexed;
a decoder buffer for storing the compressed video signal and the compressed audio signal separated by said demultiplexer;
a video decoder for decoding said compressed video signal in said decoder buffer;
a display for displaying a video signal decoded by said video decoder;
an audio decoder for decoding said compressed audio signal in said decoder buffer;
a speaker for outputting an audio signal decoded by said audio decoder;
a memory for storing said data signal separated by said demultiplexer; and
a CPU for analyzing the data signal stored in said memory;
wherein said CPU allows the data signal analyzed by said CPU to be stored in said decoder buffer when the analyzed data signal includes a compressed video signal or a compressed audio signal and the compression method used for the compressed video signal or the compressed audio signal is the same as that used for said compressed video signal or said compressed audio signal multiplexed in the digital broadcast signal.

8. A CPU for use in receiving and processing a digital broadcast signal in which a compressed video signal, a compressed audio signal, and a data signal in association with the compressed video and audio signals are multiplexed,
wherein said CPU analyzes whether or not a compressed video signal or a compressed audio signal is included in said data signal, and whether the compression method used for the compressed video signal or the compressed audio signal or said compressed audio signal multiplexed in the digital broadcast signal; and
based on the result of the analysis, said CPU changes the destination to which the data signal is outputted.

9. A decoder for use in receiving and processing a digital broadcast signal in which a compressed video signal, a compressed audio signal, and a data signal in association with the compressed video and audio signals are multiplexed, comprising:
a decoder buffer for storing said compressed video signal and said compressed audio signal;
a video decoder for decoding said compressed video signal in said decoder buffer;
an audio decoder for decoding said compressed audio signal in said decoder buffer; and
a CPU for analyzing said data signal,
wherein said CPU allows the data signal analyzed by said CPU to be stored in said decoder buffer when the analyzed data signal includes a compressed video signal or a compressed audio signal and the compression method used for the compressed video signal or the compressed audio signal is the same as that used for said compressed video signal or said compressed audio signal multiplexed in the digital broadcast signal.

10. A digital broadcast receiver comprising:
a demultiplexer configured to receive a digital broadcast signal and separate a compressed video signal, a compressed audio signal, and a data signal out of the received digital broadcast signal;
a decoder buffer coupled to the demultiplexer to receive and store the compressed video signal and the compressed audio signal separated by the demultiplexer;
a video decoder coupled to the decoder buffer to receive and decode the compressed video signal;
an audio decoder coupled to the decoder buffer to receive and decode the compressed audio signal;
a memory coupled to the demultiplexer to receive and store the data signal; and
a CPU coupled to the memory to receive and analyze the data signal;
wherein if the data signal includes a compressed video signal or a compressed audio signal that is compressed using the same compression method for the compressed video signal or the compressed audio signal separated out of the digital broadcast signal, the CPU causes the data signal to be stored in the decoder buffer to enable processing of the data signal by at least one of the decoders.

11. The digital broadcast receiver according to claim 10, wherein the CPU decodes the data signal in response to the data signal not containing data that is compressed using the same compression method used on the compressed video signal or the compressed audio signal separated out of the digital broadcast signal.

12. The digital broadcast receiver according to claim 10, wherein the decoder buffer is configured to store the compressed video signal and the compressed audio signal separated out of the digital broadcast signal as well as a compressed video signal and a compressed audio signal that may be included in the data signal using time division, and to use each of the signals in an exclusive manner.

13. The digital broadcast receiver according to claim 10, wherein the video decoder and the audio decoder retain a write address used when a compressed video signal and a compressed audio signal included in the data signal are written into the decoder buffer, and determine the progress of decoding or determine whether the compressed video signal and the compressed audio signal in the decoder buffer are depleted, based on a difference between the write address and a read address for the video decoder and the audio decoder to read the decoder buffer, whereby the video decoder and the audio decoder stop, resume, or repeat decoding of data.

14. The digital broadcast receiver as claimed in claim 10, wherein the video decoder and the audio decoder produce an interrupt signal for the CPU according to whether the compressed video signal and the compressed audio signal accumulated in the decoder buffer are depleted, or according to the progress of decoding, whereby the CPU controls decoding data based on the interrupt signal.

15. The digital broadcast receiver as claimed in claim 10, wherein the video decoder and the audio decoder produce a frame pulse interrupt signal, whereby the CPU, responsive to the frame pulse interrupt signal, controls decoding compressed video and compressed audio signals by counting the number of frames related to the frames of the compressed video signal and the compressed audio signal.

* * * * *